United States Patent [19]
Greiner et al.

[11] Patent Number: 5,230,568
[45] Date of Patent: Jul. 27, 1993

[54] LINEAR BEARING

[75] Inventors: Heinz Greiner, Ebersbach/Fils; Richard Negele, Esslingen; Siegmund H. Kaiser, Nürtingen, all of Fed. Rep. of Germany

[73] Assignee: INA Lineartechnik oHG, Bad Homburg, Fed. Rep. of Germany

[21] Appl. No.: 727,996

[22] Filed: Jul. 10, 1991

[30] Foreign Application Priority Data

Jul. 12, 1990 [DE] Fed. Rep. of Germany ....... 4022168

[51] Int. Cl.⁵ .......................................... F16C 29/06
[52] U.S. Cl. ................................................. 384/44
[58] Field of Search ................................. 384/43–45

[56] References Cited

U.S. PATENT DOCUMENTS

| | | | |
|---|---|---|---|
| 3,111,350 | 11/1963 | Anderson | 384/44 |
| 3,304,133 | 2/1967 | Strassberg | |
| 3,758,176 | 9/1973 | Stapley | 384/44 |
| 3,964,802 | 6/1976 | Pitner | 384/44 |
| 4,396,235 | 8/1983 | Teramachi | 384/44 |
| 4,496,195 | 1/1985 | Kwon et al. | 384/44 |

FOREIGN PATENT DOCUMENTS

| | | |
|---|---|---|
| 0164540 | 12/1985 | European Pat. Off. |
| 0318980 | 6/1989 | European Pat. Off. |
| 2620864 | 11/1977 | Fed. Rep. of Germany |
| 3104825 | 8/1982 | Fed. Rep. of Germany |
| 3207515 | 9/1983 | Fed. Rep. of Germany |
| 3303832 | 9/1983 | Fed. Rep. of Germany |
| 3228762 | 2/1984 | Fed. Rep. of Germany |
| 3324840 | 10/1984 | Fed. Rep. of Germany |

Primary Examiner—Thomas R. Hannon
Attorney, Agent, or Firm—Frishauf, Holtz, Goodman & Woodward

[57] ABSTRACT

A linear bearing with revolving roller elements has a carrier body on which a closed track is formed, the runner elements moving on this track, which comprises a load track, a return track, and two substantially U-shaped roller element deflection tracks. Lateral guide means are provided for the roller elements: the guide means have homogeneous lateral guide walls for the roller elements and are formed to be step-free and continuous over the length of the load track and over at least part of the adjacent deflection tracks.

20 Claims, 5 Drawing Sheets

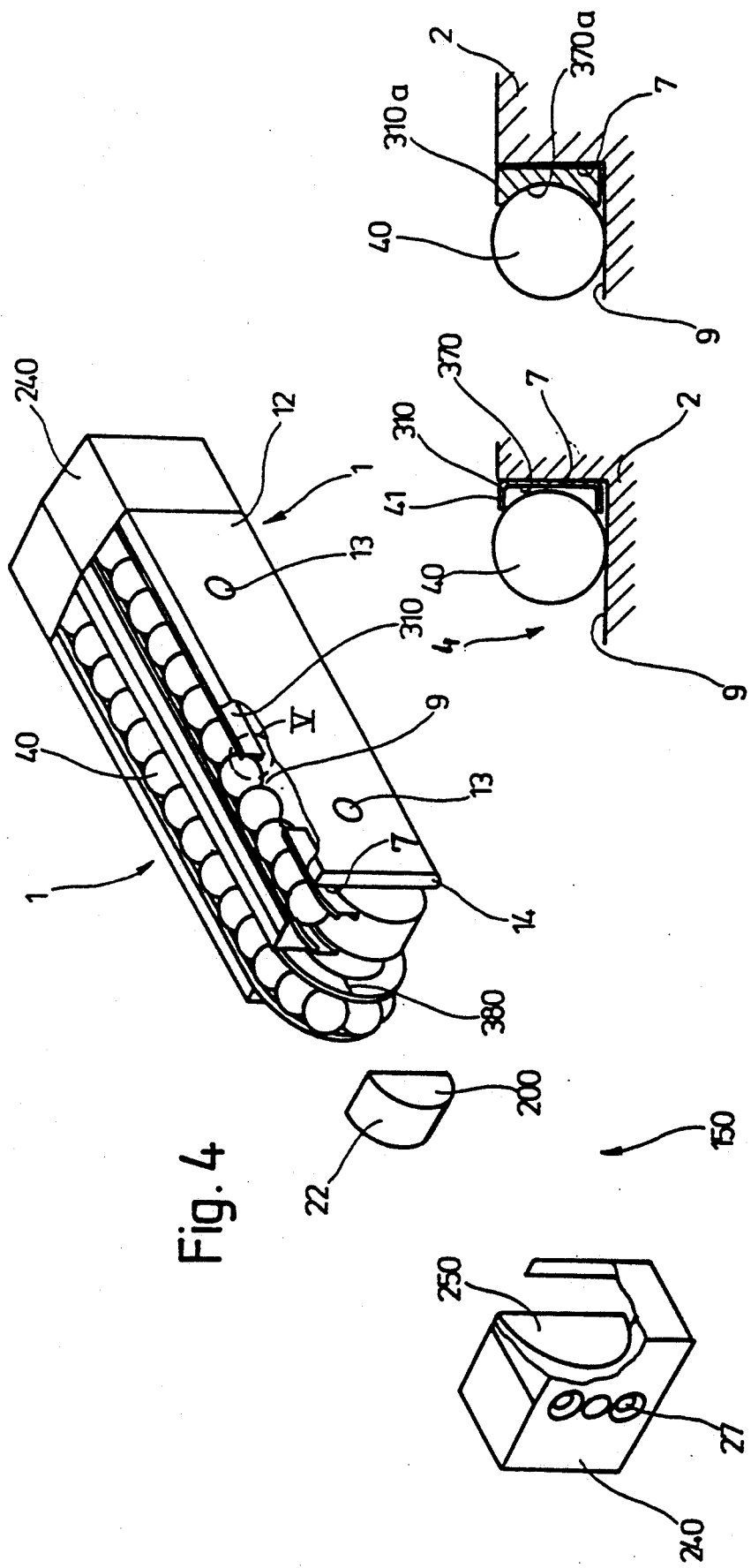

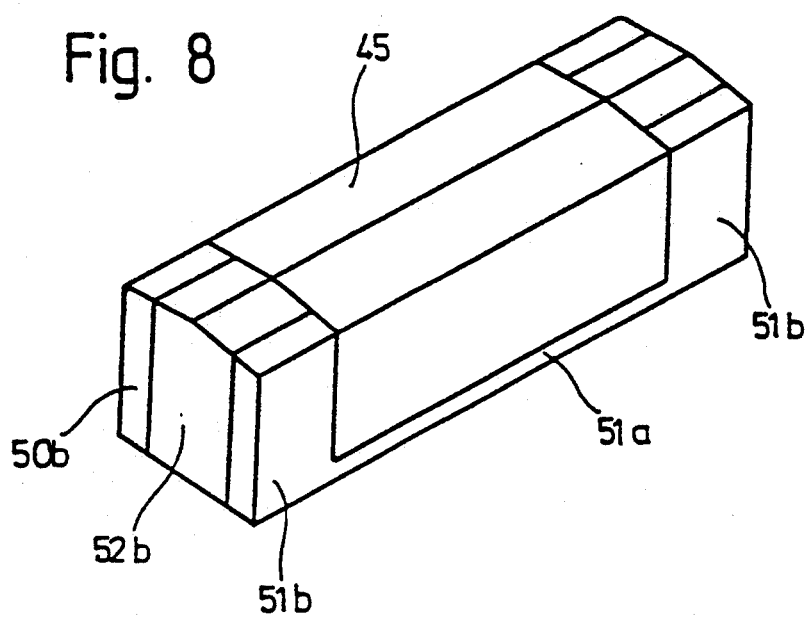
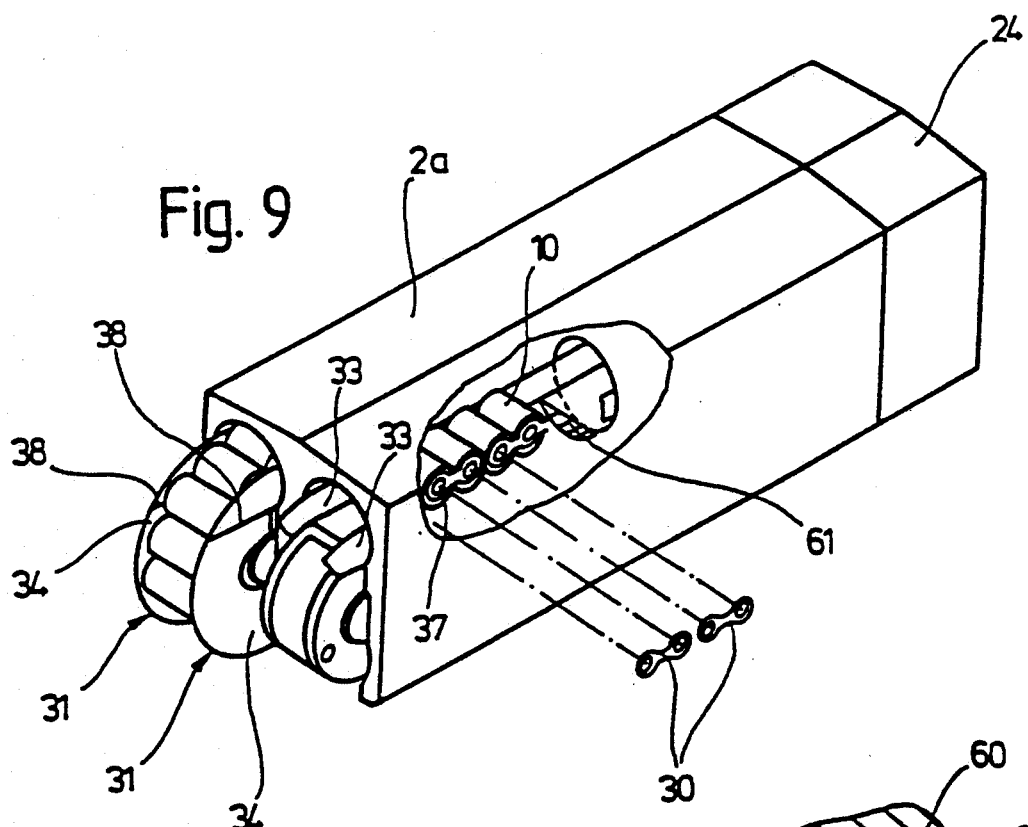
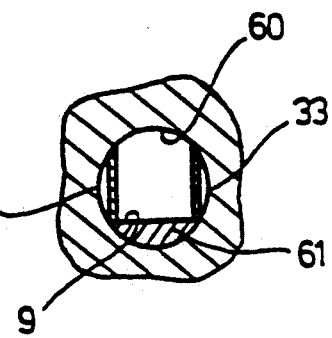

LINEAR BEARING

FIELD OF THE INVENTION

The invention relates to a linear bearing with revolving roller elements.

BACKGROUND

Linear bearings are known that have a carrier body, on which pairs of tracks associated with one another and defined by lateral guide means and on which tracks roller elements move are formed. One of them, the load track, is associated with the supporting roller elements, and the other, the return track or path, is arranged for returning the unloaded roller elements; the two tracks are joined together at their ends by essentially U-shaped roller element deflection tracks, forming a closed path.

Linear bearings of this type are known in many kinds of embodiments. The roller elements may be balls, rollers or drum-like elements, and so forth, which are located one behind the other on the load track for a pressure column. In other conventional embodiments, however, the roller elements are kept spaced apart from one another by special provisions. For instance, the roller-like roller elements, carrying bearing journals on the ends, are supported on these journals in chain links, resulting in an endless interlocking structure in the manner of a "pull chain". A fundamental feature of these linear bearings is that the roller elements must be guided very accurately on the tracks, because otherwise they jam against one another, or in the case of roller elements in the form of rollers they tilt or wobble. Such phenomena cause rough operation, vibration, and so-called stick-slip effects, and so forth, which moreover entail increased wear and thus shorten the service life of the linear bearing.

For production reasons, it is necessary as a rule to produce the roller element deflectors disposed on the ends of the load track as separate parts that are secured to the carrier body and have the deflection tracks for the roller elements. In order to guide the roller elements on the substantially U-shaped deflection path, multiple-piece deflector devices are often necessary, the individual parts of which are held together by clamping shackles and the like. Because of their complicated shape, the parts are certainly not made of the same material as the carrier bodies (which as a rule are of steel); instead, materials that are readily molded and more favorable in cost are used, such as aluminum, plastic, brass, and so forth.

Thermal changes in state, caused for instance by increased operating temperatures, can cause displacements and variable changes in length of these parts of the deflector devices relative to one another and in comparison with the carrier body, with the result that the very close tolerances that are indispensible for satisfactory lateral guidance of the roller elements are exceeded, with the disadvantageous effects noted. Since the deflector devices are mounted on the carrier bodies on the face end, so that their face dividing them from the carrier body is located directly at the end of the load track (see FIG. 6 of German Patent 33 03 832 to Teramachi, for instance), the transition point between the load track and the deflection track is at an intrinsically highly unfavorable point, at which the roller elements traveling on the load track, for instance, are relieved and in this process undergo a certain elastic deformation. Because of the close tolerance in terms of lateral guidance of the roller elements, these linear bearings therefore entail relatively high production expense, and may possibly require re-machining after assembly in the region of the roller element deflections.

THE INVENTION

It is the object of the invention to create a linear bearing that is distinguished by satisfactory lateral guidance of the roller elements, at a low production cost.

Briefly, the guide means are formed as smooth, step-free, continuous homogeneous lateral guide walls for the roller elements extending over the length of the load track and over at least a portion of the adjacent deflection tracks. As a result the roller elements in a critical region at the exit from and entry to the load track, are laterally guided exactly, regardless of any changes in operating temperature or other factors affecting the linear bearing. The lateral guidance of the roller element is impact-free in these regions, so that tilting or jamming of the roller elements is reliably avoided.

The homogeneous guide walls can advantageously be formed to be continuous and step-free as far as the end up to and including the deflection tracks, so that they line the entire U-shaped arc of the deflection tracks. Depending on the bearing construction, however, embodiments are also possible in which the guide walls extend over only a part of the deflection tracks, but in that case this part must be dimensioned long enough so that secure, close-tolerance lateral guidance of the roller elements continues to be assured in this critical region.

The homogeneous guide walls can also be formed with smooth flat surfaces, or with their cross-sectional profile adapted to the shape of the roller elements, or they may be U-shaped. The preferred embodiment in an individual case will depend on the type of roller element (ball, roller, etc) used and on the specialized bearing construction involved. It can be stated in general that smooth flat guide faces are distinguished by particularly simple production conditions, while shaped guide faces have the advantage of simultaneously retaining the roller elements especially balls in captive fashion.

The homogeneous guide walls can advantageously be of metal, but in individual cases they may also be made of plastic; in both cases, the guide walls can be provided with a wear- or friction-reducing coating, at least in some regions.

DRAWINGS

Exemplary embodiments of the subject of the invention are shown in the drawings.

FIG. 1 is a perspective view, partly cut away or dismantled, of a linear bearing according to the invention, in a first embodiment, additionally showing the individual parts of a roller element deflector device;

FIG. 2, in a side view on a different scale, is a sectional view of the linear bearing of FIG. 1, taken along the line II—II of FIG. 1;

FIG. 4 shows a second embodiment of a linear bearing according to the invention, in a view corresponding to FIG. 1;

FIG. 5 shows a detail of the return track of FIG. 4 at the point marked V in FIG. 4, in section and on a different scale;

FIG. 6 shows the detail of FIG. 5 in a modified embodiment and in a corresponding view;

FIG. 8 is a perspective view in the assembled state of the linear bearing of FIG. 7;

FIG. 9 is a perspective view, partly cut away and dismantled, of a linear bearing according to the invention in a fifth embodiment; and FIG. 10 is a detail of the carrier body of the linear bearing of FIG. 9, to illustrate a return track.

DETAILED DESCRIPTION

Figure 1:
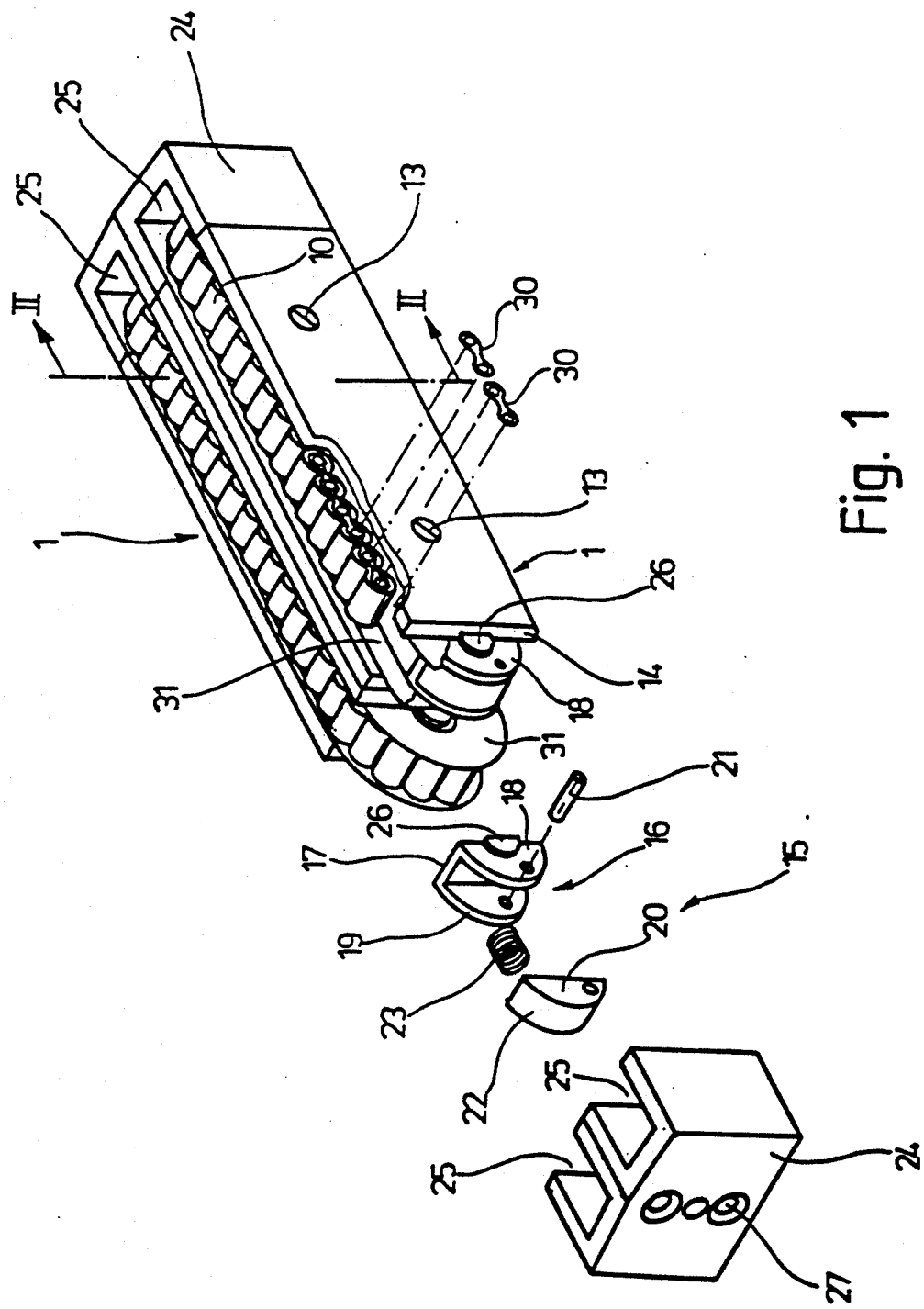
Figure 3:
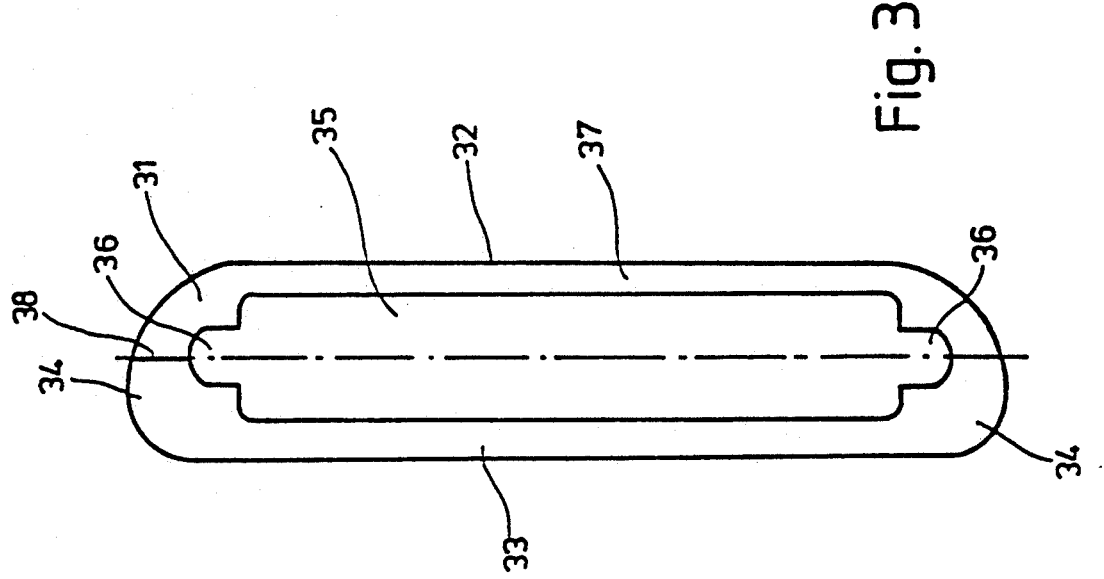
FIG. 3 is a plan view, on a different scale, of a guide baffle of the linear bearing of FIG. 1.
Figure 2:
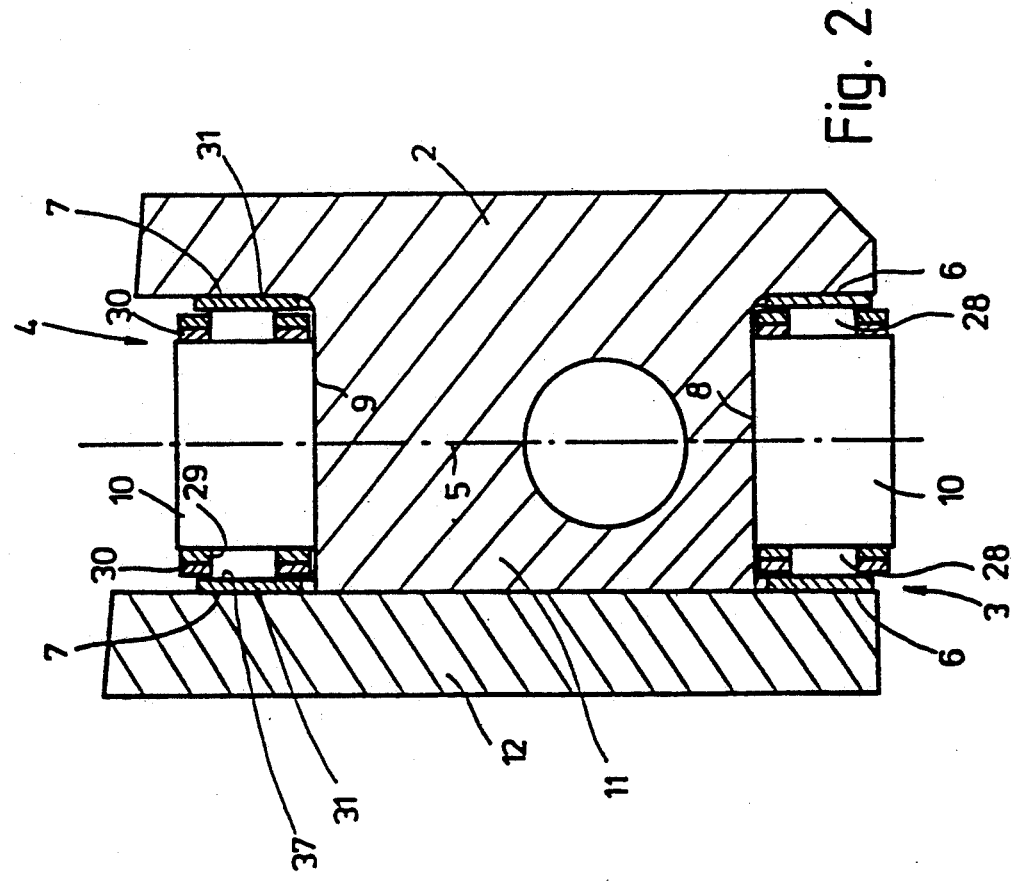

The linear bearing shown in FIGS. 1-3 is a double bearing, comprising two identical linear bearing units 1 that are secured on their long sides to one another, or alternatively are embodied correspondingly uniformly.

It will accordingly suffice to describe only one of the linear bearing units, as follows:

The linear bearing unit 1 has an elongated carrier body 2 (FIG. 2) of substantially rectangular cross section and defined by parallel sides; it is made of steel and is provided on its opposed short sides with two parallel longitudinal grooves 3, 4, of which the common plane of symmetry is shown at 5. The identical longitudinal grooves forming running tracks 3, 4 are each defined by parallel side walls 6 and 7, between each of which pairs of walls a flat bottom wall 8 and 9, respectively extends; the bottom wall forms a base for the respective track for roller elements formed as cylindrical rollers 10.

The depth of the longitudinal groove 3 (the bottom one in FIGS. 1, 2) is less than the diameter of the rollers 10 so that the carrier body 2 can be supported, via its base 8 of track 3 and the roller column located in the longitudinal groove 3, against a guide rail (not shown in further detail) on which the rollers 10 supporting the track travel. The track associated with the supporting rollers 10 will therefore hereinafter be called the load track.

The opposite longitudinal groove 4 with base 9 is deeper than the diameter of the rollers 10, which thus rest inside the outline of the carrier body 2, as can be seen from FIG. 2. It serves to return the unloaded rollers 10; its track is therefore hereinafter called the return track. For simplicity, the bases 8, 9 of the tracks 3, 4 are at times also referred to merely as "tracks".

A rib-like part 11 of the carrier body 2, the cross section of which is approximately in the form of a double T, extends between the load track 8 and the return track 9. The side walls 6, 7 of the grooves are formed on a flat plate or rail 12, which is screwed to the rib 11 by means of screws 13 (FIG. 1). Alternatively, the carrier body 2 could also be formed in one piece.

Deflector devices 15 (FIG. 1) for the rollers 10 are disposed on the opposed, parallel, flat end faces 14 of the carrier body 2. Each of these deflector devices 15 comprises a bearing element 16 of approximately U-shaped cross section, which is mounted with a flat bottom face 17 on the end face 14 of the carrier body 2, and which has two parallel cheeks 18, the peripheral faces 19 of which are located on the same imaginary cylinder. A shaped element 20 is pivotably supported between the two cheeks about a bearing pin 21 extending parallel to the tracks 8, 9 and introduced into corresponding bores of the cheeks 18. The shaped element 20 has a substantially cylindrical outer face 22; it is supported against the bearing element 16 via a compression spring 23 disposed inbetween which tends to pivot the shaped element 20 counterclockwise, with respect to of FIG. 1, about the bearing pin 21.

The outer face 22 of the shaped element 20, together with the peripheral faces 19 of the bearing element 16, join the two tracks 8, 9 on both sides of the carrier body 2 to one another, with the overall result being a closed track on which the rollers 10 revolve.

A deflector hood 24 common to both linear bearing units 1 and formed for each linear bearing unit 1 with a guide groove 25 defined by parallel sides, the width of the groove corresponding to that of the longitudinal grooves 3, 4, is mounted on the applicable end face 14 of the carrier body 2; in its respective guide groove 25, it receives a deflector device 15, and simultaneously fixes the bearing element 16 in the correct position on the end face 14 of the carrier body 2, by means of formed-on journals 26. For fastening the deflector hood to the carrier body 2, countersunk screws (not shown in detail) are used, which protrude through appropriate screw holes 27 and are screwed into threaded bores of the carrier body 2.

The rollers 10 are formed on both sides with coaxial, cylindrical bearing journals 28 (FIG. 2), by means of which they are rotatably supported in corresponding bearing bores 29 of chain links 30 (FIG. 1), which join the rollers 10 together to form an endless "pull chain", in which adjacent rollers 10 are spaced apart from one another.

To assure satisfactory guidance of the rollers 10 revolving on the aforementioned closed track, and in particular to prevent tilting or wobbling of the rollers as they travel along the load track 8, the rollers 10 are laterally guided by special guide means. These lateral guide means have two flat-surfaced baffles 31, the form of which can be seen particularly in FIG. 3. Each of the elongated baffles 3 is formed with two parallel guide ribs 32, 33, which are joined together on both ends by two substantially U-shaped deflection segments 34, such that the baffle is provided with a rectangular opening 35, which is adjoined by two opposed recesses 36.

The two baffles 31 provided per linear bearing unit 1 are mounted with their openings 35 on the rib 11 of the carrier body 2, with their recesses 36 fitting around the journals 26 of the bearing elements 16. The thickness of the baffles 31 is dimensioned such that they are supported on their outside by the longitudinal groove side walls 6, 7, guiding the rollers 10 laterally with close tolerances via the face ends of their bearing journals 28. On their inside 37 (FIG. 2), they form homogeneous lateral guide walls, which with the rib 32 extend over the entire length of the load track 8, with the rib 33 likewise extending over the entire length of the return track 9, and with the deflection segments 34 extending over the length of the U-shaped deflection track in the region of the peripheral faces 19, bearing element 16, and outer face 22 of the shaped parts 20, in each case extending continuously in a step-free manner. The height of the ribs 32, 33 is less than the diameter of the rollers 10, so that the baffles 31 do not protrude beyond the rollers 10 in the region of the tracks 8, 9. However, the deflection segments 34 are dimensioned such that in the region of the deflector devices 15, they protrude radially beyond the rollers 10 in the manner visible on the left in FIG. 1; in this region, they are located inside the guide grooves 25 of the deflector hood 24, with the result that in the deflection regions as well, the rollers 10 are laterally guided within close tolerances in a satisfactory manner.

Since the guide faces 37 of the baffles 31 facing the rollers 10 have no shoulders, and the baffles themselves are stamped uniformly and homogeneously from sheet steel, the rollers 10 cannot catch or tilt, particularly in the critical regions upon exiting the load track 8, regardless of any changes in operating temperature of the linear bearing or of fluctuating loading thereof.

The baffles 31 are suitably produced from sheet steel with a high surface quality in the region of the guide faces 37; however, they may also be of plastic material, and regardless of the material selected may be provided with a coating of a wear-and friction-reducing material.

In embodiments in which the carrier body 2 is integrally embodied, the supporting baffles 31 are severed along a cutting edge 38 (FIG. 3), so that they can be mounted on the rib 11 by their opening 35. The cutting edge 38 is located in a noncritical portion of a deflection region in which the rollers 10 are relieved, so that in this respect there is no impairment in lateral guidance of the rollers.

If necessary, the baffles 31 can be re-machined on their guide face and thus adjusted to the closest possible tolerances. Particularly if they are of sheet steel, they exhibit virtually the same thermal behavior as the carrier bodies 2 made of steel.

Even slight changes in length of the "pull chain" formed of the chain links 30 and rollers 10 have no influence on the lateral guidance of the rollers 10. The pull chain is kept under tension by the compression springs 23 and the shaped elements 20. Since the deflection segments 34 of the baffles 31 protrude radially past the rollers 10 in the region of the deflector devices 15, satisfactory lateral guide conditions are always assured.

The second embodiment of a novel linear bearing shown in FIGS. 4, 5 corresponds in essential features to the first embodiment described in conjunction with FIGS. 1–3. Identical elements are therefore provided with the same reference numerals and will not be described again here.

In a deviation from the embodiment of FIGS. 1–3, the roller elements in this embodiment are formed by balls 40. The balls again travel in the longitudinal grooves, defining by parallel sides, of the carrier body, the cross sectional shape of which corresponds to that of FIG. 2. Of the longitudinal grooves, only the upper longitudinal groove 4 containing the return track 9 is visible in FIGS. 4, 5.

The deflector device 150 mounted on both sides on the end faces 14 of the carrier body has a shaped element 200, which is seated without resilience on the carrier body and is fixed in position on it by the deflector hood 240.

Once again, the lateral guide means for the balls 40 comprise two baffles, shown at 310 and inserted into the longitudinal grooves of the carrier body such that they are supported by the side walls of the grooves, as seen in FIG. 5 for the upper longitudinal groove 4 and for one side wall 7 thereof.

The baffles 310 are curved in the manner of rails, and have the same width over their entire length. They rest both on the load and return tracks and on the outer surface 22 of the shaped elements 200 and thus effect the retention of the shaped elements 200. Moreover, the deflector hoods 240 for each linear bearing unit 1 are provided with a pocket-like recess 250 adapted to the shape of the deflection track, so that when the deflector hoods 240 are in place, the baffles 310 are firmly fastened in both deflection regions.

The baffles 310, of U-shaped cross section, effect exact lateral guidance of the balls 40 along the straight, close-tolerance lateral guide wall 370. At the same time, however, the balls 40 are retained in captive fashion by the bent flanges 41, thus making additional provisions unnecessary.

With the carrier body in the form shown, with a removable plate 20, the baffles 310 are embodied as endless; with an integral carrier body, they are severed along a cutting edge 380, which again is located in a noncritical portion of a deflection region.

Alternatively, the baffles 310 may also be modified in the manner seen in FIG. 6, in which baffles 310a are shown that are adapted to the shape of the balls 40 in the region of their guide wall 370a that cooperates with the balls 40.

The baffles 310, 310a may also be made of steel, some other metal, or plastic material, with or without coating.

Figure 7:
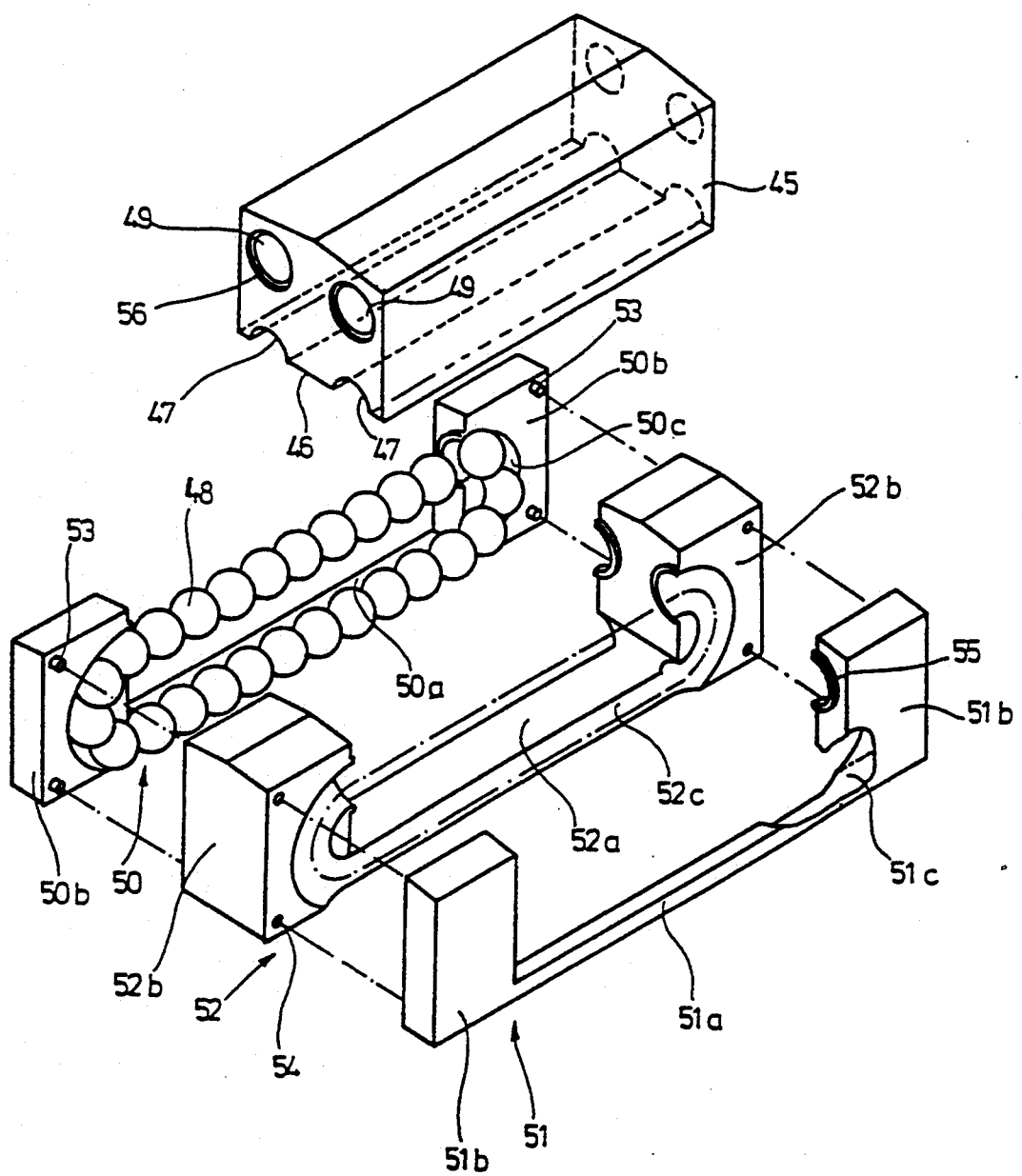
FIG. 7 is a perspective view of a linear bearing according to the invention in a third embodiment, shown in the disassembled state.

In the third embodiment of the novel linear bearing, as shown in FIGS. 7, 8, the carrier body is shown at 45. It is substantially in the form of a parallelepiped, and in the region of its lower, flat face 46, it has two parallel groove-like load tracks 47, the cross section of which is approximately part of a circle, and on which roller elements in the form of balls 48 travel. Spaced apart from and above the load tracks 47 in the carrier body 45, two parallel through-bores 49 are provided, which form the return tracks for the balls 48.

Lateral guidance of the balls 48 is provided by three guide elements 50, 51, 52, which are embodied as shell-shaped or shackle-shaped and are substantially in the form of a U. Each of the guide elements 50–52 has a rib-like element 50a, 51a and 52a, respectively, each of which joins two substantially block-like legs or deflector elements 50b, 51b and 52b to one another. The arrangement is so selected, see FIG. 7, that the outer guide elements 50, 51, with flat faces, laterally adjoin the middle guide element 52, and with respect to it are fixed in the exactly correct position by means of alignment pins 53 and alignment bores 54.

In the region of the flat side faces, facing one another, of the guide elements 50–52, groove-like indentations 50c, 51c, 52c, respectively, the cross.-sectional profile of which is substantially that of a part of a circle, are formed, extending in a step-free manner in an essentially C-shaped form over the rib-like elements 50a, 51a and 52a and the adjoining deflector elements 50b, 51b and 52b, respectively.

With their wall, these channel-like indentations 50a–52c, in the installed state, form the later guide walls for the balls 48, which are thus guided with close tolerances in a step-free manner, on both sides, by continuous, homogeneous guide walls over the entire length of the load tracks 47 and the adjacent, essentially U-shaped deflection tracks extending in the deflector elements 50b, 51b, 52b.

The dimensions of the carrier body 45 and guide elements 50–52 are selected such that in the installed state, shown in FIG. 8, the carrier body 45 fits precisely between the opposed deflector elements 50b, 51b, 52b; collar-like extensions 55 provided thereon in the region of the mouth of the groove-like indentations 50c, 51c, 52c engage corresponding countersunk portions 56 of the bores in the carrier body 45 that form the return tracks 49, thus assuring a satisfactory transition from the deflection tracks to the return tracks 49. The guide elements 50–52 are elastic enough so that they can be bent slightly upon assembly, to enable insertion of the carrier body 45.

The further embodiment of a novel linear bearing finally also shown in FIGS. 9, 10 is a modification of the embodiment of FIGS. 1–3. Identical elements are therefore again provided with the same reference numerals and not described further here. While in the embodiment of FIGS. 1–3, the return track 9 is formed in the bottom of an open longitudinal groove 4, in the embodiment of FIGS. 9, 10 the return track 9 is formed by a respective continuous bore 60 of the carrier body 2a, which is otherwise equivalent to FIG. 3 in its cross section. The result is a closed, self-contained type of structure.

To this end, an elongated track element 61 having a cross section in the form of a circular segment is placed in the respective longitudinal bore 60, supporting the flat return track 9 and resting flush against the bore wall. The upper ribs 33 (FIG. 3) of the two baffles 31 are passed through the longitudinal bore 60, so that regardless of the tolerance of the bore, satisfactory lateral guidance of the rollers 10 is assured even in the region of the return track 9. The baffles 31 are severed along the cutting line 38, to enable assembly; in this case, the cutting line is disposed in the extension of the upper rib 33 and thus, in the installed state, is located in a noncritical portion of the deflection region.

Naturally this embodiment could also be made with roller elements in the form of balls, in which case the baffle 310 or 310a, of U-shaped cross section or profiled, of the kind shown in FIGS. 5, 6 would be used.

The various embodiments of linear bearings described above and shown in the drawing are all embodied in the form of double bearings, in which two rows of roller bearings are located spaced apart from one another and side by side, with their tracks located in parallel planes. Except for the fact that— as already noted— the linear bearing units 1 can also be used singly, the invention is in principle independent of the shape of the guide rail and of any carriage movable on this guide rail, supported via such linear bearings. For instance, the carriage may have a substantially C-shaped cross section and may be embodied to fit around the associated guide rail, being supported on the guide rail by means of a linear bearing that has rows of roller elements the tracks of which are located in planes that in pairs form an angle of 90°, for instance, with one another (see German Patent 33 03 832, for example). The roller elements may be balls, rollers, drum-like elements, and so forth.

In a suitable linear bearing construction, the arrangement may be such that the homogeneous guide walls are formed on shell-shaped or shackle-shaped parts— advantageously those of substantially C- or U-shape— which are joined to the carrier body.

In another advantageous embodiment, the homogeneous guide walls may also be formed on baffles that at least over the length of the load track are located laterally between the roller elements and an outer support of the carrier body, or some part connected thereto. These guide aces may be floatingly supported on the carrier body, but embodiments are also possible in which the guide faces are firmly fastened, at least in the region of the deflection tracks.

Optimal guide conditions for the roller elements can be attained if the guide faces each extend over the entire length of the load and return track and of the deflection tracks.

To this end, the guide faces may be formed with an elongated opening, with which they are placed on a rib of the carrier body that supports at least the load track. For reasons of assembly, they may be severed at some noncritical point located outside the load track. The guide faces are embodied such that at least in the region of the load track, they do not protrude beyond the diameter of the roller element. However, depending on how the linear bearing is embodied, it may be advantageous to form the guide face such that it protrudes radially past the roller elements in the region of the deflection tracks, so as to improve the lateral guidance of the roller elements in the deflection regions— and possible in the region of the return track— and simultaneously effect a lateral covering of the roller elements.

The guide faces themselves may have a flat surface or be profiled (for instance in a U shape, or in a shape adapted to that of the roller elements); they may then also assume a more rail-like shape.

The return track for the roller elements may be formed in the shape of an open groove of the carrier body, but with a view to a self-contained linear bearing structure it may also be practical to have the return track extend through a bore of the carrier body. In that case, the arrangement may also be such that the guide faces extend through this bore, which has the advantage that no particular demands are made in terms of the accuracy of manufacture of the bore, because the lateral guidance of the roller elements is effected simply by the guide face.

The guide faces have particular advantages in the assembly of the roller elements, because they provide guidance when the column or pull chain, referred to at the outset, of roller elements is introduced, so that no additional assembly guide devices are for instance needed, if the roller elements are introduced in the form of cartridges. This also affords the opportunity of simple, automatic assembly of the roller elements, and replacement of the roller elements or of the pull chain of roller elements is possible without difficulty; they can even be assembled by the customer, and customized sizing makes it possible to specify the initial tension with which the roller elements are guided.

Various changes and modifications may be made, and any features may be used with others, within the scope of the inventive concept.

What is claimed is:

1. A linear bearing with revolving roller elements, comprising a carrier body (2), a pair of running tracks (3, 4) associated with one another and defined by lateral guide walls (6, 7) and bottom walls (8, 9) in the carrier body;

track roller elements (10, 40, 48) movably located in said tracks, one track forming a load track (3, 8, 47) for load supporting roller elements, and another track (4, 9), forming a return track or path, arranged for returning unloaded roller elements;

essentially U-shaped roller element deflection tracks (19, 22, 50–52c) joining the load and return tracks together at the ends, so that the tracks form a closed loop path; and baffles (31) floatingly supported on the carrier body (2) located laterally between the roller elements (10) and the lateral guide walls, wherein the baffles, at least over the length of the load track (3,8,47), and at least over a portion of at least one of: the deflection, and return tracks adjacent said load track are formed as smooth, step-free continuous homogeneous lateral guide walls (31, 37; 370, 50a . . . 52c) for guiding said roller elements (10; 40, 48).

2. The linear bearing in accordance with claim 1, characterized in that
the homogeneous guide walls (50c–52c) are continuous and step-free as far as the end of the deflection tracks.

3. The linear bearing in accordance with claim 1, characterized in that
the homogeneous guide walls are formed on shell- or shackle-like elements (50–52) that are joined to the carrier body (50).

4. The linear bearing in accordance with claim 3 characterized in that
the shackle-like elements (50–52) are substantially C- or U-shaped.

5. The linear bearing in accordance with claim 1, characterized in that
the homogeneous guide walls (37) are flat.

6. The linear bearing in accordance with claim 5, wherein the homogeneous guide walls comprise metal.

7. The linear baring in accordance with claim 5, wherein the homogeneous guide walls comprise a plastic.

8. The linear bearing in accordance with claim 5, including a wear-reducing or friction-reducing coating formed on at least some regions of said homogeneous guide walls.

9. The linear bearing in accordance with claim 1, characterized in that
the homogeneous guide walls (370) are U-shaped in cross section, at least in the region of the roller elements (40).

10. The linear bearing in accordance with claim 1, characterized in that
the shape of the homogeneous guide walls (370a) is adapted in their cross-sectional profile to the shape of the roller elements (40).

11. The linear bearing in accordance with claim 1, characterized in that
the homogeneous guide walls comprise metal.

12. The linear bearing in accordance with claim 1, characterized in that
the homogeneous guide walls comprise a plastic.

13. The linear bearing in accordance with claim 1, characterized in that
the homogeneous guide walls are provided at least in some regions with a wear-reducing or friction-reducing coating.

14. The linear bearing in accordance with claim 1, characterized in that
the baffles (310) are firmly fastened at least in the region of the deflection tracks.

15. The linear bearing in accordance with claim 1, characterized in that
the baffles (31, 310) each extend over the entire length of both the load and return track (8, 9) and of the deflection tracks (22, 19).

16. The linear bearing in accordance with claim 1, characterized in that
the baffles (31, 310) are formed with an elongated opening (35), with which they are mounted on a rib (11), supporting at least the load track (8), of the carrier body (2).

17. The linear bearing in accordance with claim 16, characterized in that
the baffles (31, 310) are severed at a point (38) located outside the load track (8).

18. The linear bearing in accordance with claim 1, characterized in that
the return track (49; 60) extends through a bore of the carrier body (45, 2a).

19. The linear bearing in accordance with claim 1, characterized in that
the return track (49; 60) extends through a bore of the carrier body (45, 2a); and
that the baffles (31) extend through the bore (60).

20. The linear bearing in accordance with claim 1, characterized in that
the roller elements are rollers (10), and chain links (30) are provided, which couple the rollers (30) together.

* * * * *